Nov. 9, 1965    F. MELZER    3,216,303
LOAD SENSING AND INDICATING MEANS
Filed Dec. 3, 1963    2 Sheets-Sheet 1
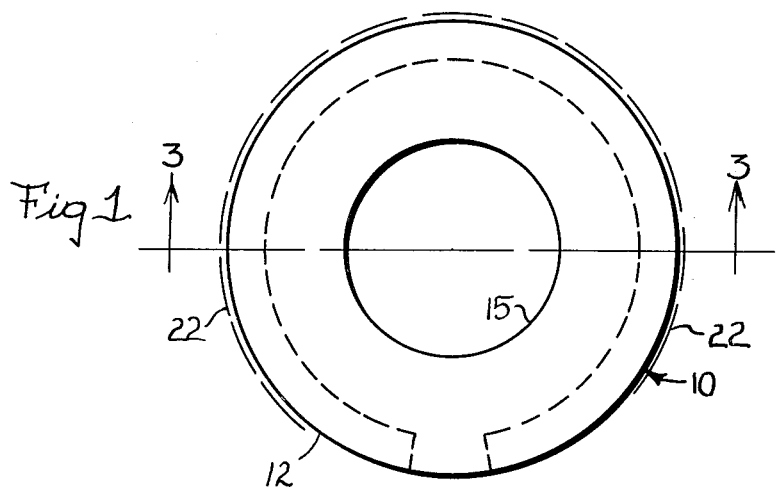
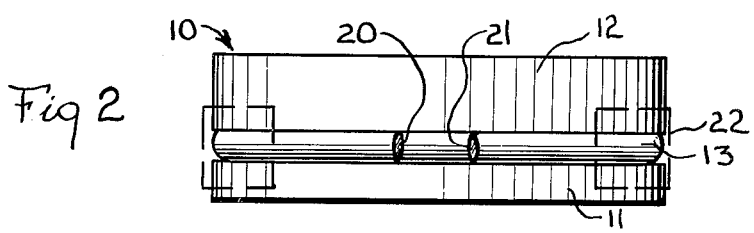
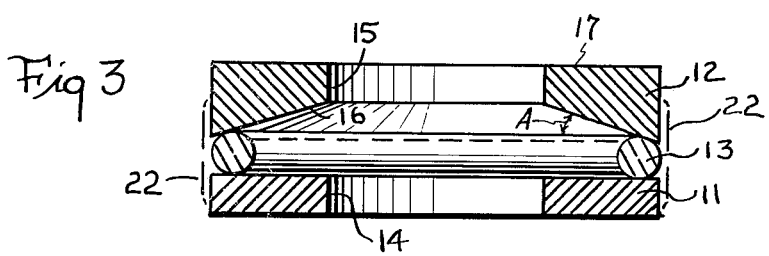
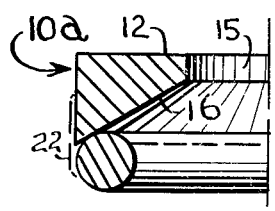
INVENTOR.
FRANKLIN MELZER
BY
Albert W. Scribner

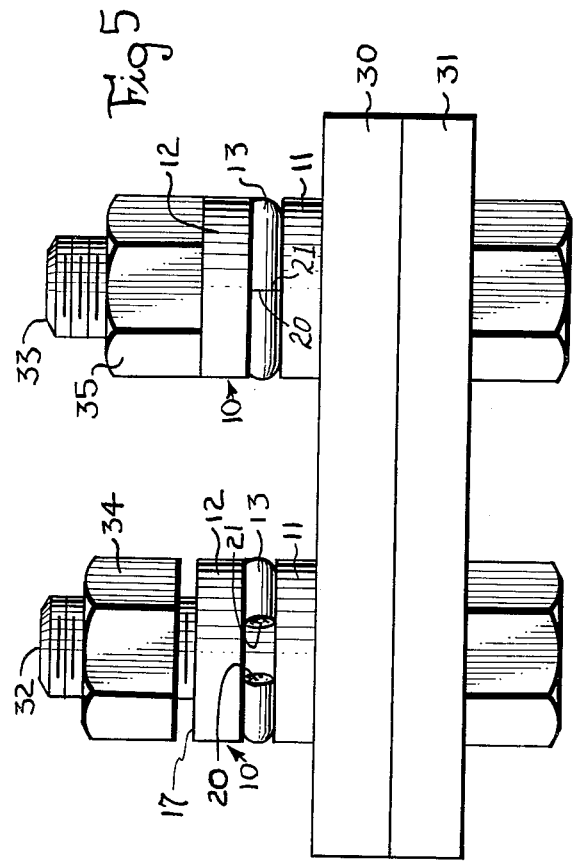

United States Patent Office 3,216,303
Patented Nov. 9, 1965

3,216,303
LOAD SENSING AND INDICATING MEANS
Franklin Melzer, 55 Hazelwood Lane, Stamford, Conn.
Filed Dec. 3, 1963, Ser. No. 327,716
1 Claim. (Cl. 85—62)

This invention relates to a novel load sensing and indicating means for threaded type fasteners. More particularly the invention relates to an improved arrangement for affording a visual indication of the effective load carried by a threaded fastening means.

Recently high strength bolts have been introduced in structural steel connections where rivets have been previously used and a need has thereby arisen for a means to efficiently determine the tension existing at any given time in a stressed bolt. Present practice for determining the stress conditions in nut and bolt assemblies usually involves the use of a torque wrench by an inspector who tests randomly selected bolts in the structure to be checked. Besides being inconvenient, this practice does not always render a true evaluation of the tension existing in a bolt in the torque readings thus obtained are affected by many variables such as the quality of threads, lubrication, material, hardness and/or the size of the nut and bolt unit being tested. Here also the skill and integrity of the inspector affect the validity of the test results obtained. It will be apparent that such a testing system is not only costly in time and money but also does not give complete assurance that a nut and bolt unit is tightened properly.

Where a nut and bolt assembly is initially tightened to a desired extent the tension in the bolt may subsequently decrease due to various reasons such as the progressive loosening of the threaded nut; or the bolt becoming mechanically unsound due to fatigue, thermal stresses or vibrations. In view of these possibilities it is most desirable to have an efficient means for easily and rapidly checking both the initial and the subsequent stress conditions existent in a threaded fastening means.

One object of the present invention is to provide an inexpensive load sensing and indicating device which will make it possible to quickly and accurately determine at any time the stressed condition of a nut and bolt assembly.

Another object of the present invention is to provide an inexpensive load sensing and indicating device which acts as a locking means for an associated nut and bolt assembly.

Another object of the invention is to provide a novel load sensing and indicating device for a nut and bolt unit, said device permitting a load to be symmetrically applied to the associated bolt.

Another object of the invention is to provide an improved load sensing and indicating means for a nut and bolt assembly whereby a laminated combination of elements when in their stressed condition form a substantially enclosed unit which will prevent foreign particles from entering and lodging in the region of the load bearing surfaces of one or more of the said elements.

Still another object of the invention is to provide a novel load sensing and indicating device which operatively includes a rigid camming washer and a split wire ring, the latter being resilient in its own plane but axially rigid.

Other objects of the invention will become apparent as the disclosure progresses.

In the drawings:
FIG. 1 is a plan view of one embodiment of the instant invention wherein a three element composite unit is shown in its unloaded state.

FIG. 2 is a front elevational view of the apparatus shown in FIG. 1.

FIG. 3 is a sectional view taken along section line 3—3 of FIG. 1.

FIG. 4 is a fragmentary sectional view corresponding to FIG. 3 and shows a modified two-element type of composite unit.

FIG. 5 is a front elevational view showing the application of two FIG. 1 type of units; one of the units being in the unloaded state while the other is shown in the properly loaded state.

Referring to FIGS. 1–3 there is shown a composite load sensing and indicating unit 10 comprising three coaxial elements including a lower flat disc type washer 11, an upper conically recessed washer 12 and an intermediate flexible split wire ring 13. The outside diameter of the two washers 11 and 12 are substantially the same. The lower circular washer is formed with a central bolt receiving aperture 14 which is axially aligned with a similarly sized bolt receiving aperture 15 that is centrally formed through the circular upper washer. The lower bearing surface 16 of washer 12 has a frusto-conical shape as is best seen in FIG. 3 and has a base angle A in the plane of the section of FIG. 3. The axis of the frusto-conical bearing surface 16 coincides with the axis of said aperture 15, and the flat upper surface 17 of washer 12 is disposed in a plane that is substantially normal to the axis of said aperture 15. The split ring 13 is operatively disposed between the upper surface of the washer 11 and the lower recessed frusto-conical bearing surface 16 of washer 12 and is peripherally visible in the axial gap between washers 11 and 12. The ring 13 comprises a circular length of resilient spring wire of substantially circular cross section, said ring being substantially rigid in compression in a direction axially thereof but being capable of resilient movement or deflection in its own plane, i.e. in a plane disposed substantially normal to the ring axis. The ends 20 and 21 of said split wire ring are normally spaced a short distance apart, as is best seen in FIGS. 1 and 2, and no part of the ring extends beyond the radial limits of the washer 12.

The three elements 11–13 of the composite unit 10 are mutually retained together by means of one or more pieces of adhesive strip or tape as shown by the phantom lines 22 of FIGS. 1–3, the strip extending around and engaging the peripheral portions of washers 11 and 12 and ring 13 so as to hold these three elements together as a unit. This type of arrangement facilitates the handling and the installation of each unit 10. Instead of using an adhesive type tape the three elements may be cemented together at one peripheral spot diametrally opposite to the gap between the ring ends 20 and 21.

FIG. 5 illustrates an application of composite units 10. Here two members 30 and 31 are to be secured together by means of two threaded bolts 32 and 33 and the respectively associated nuts 34 and 35. A load sensing and indicating unit 10 is placed over each bolt between the related nut and the adjacent plate 30; the unit 10 associated with the bolt 32 being shown prior to the tightening of nut 34 while the unit 10 associated with bolt 33 is shown after the proper tightening of the nut 35. As each unit 10 is axially loaded by the tightening of the associated nut against the adjacent washer surface 17 the conical camming surface 16 will exert axial and radial compressive force components on the flexible ring member 13. The ring will not yield to any substantial degree to the axial component but will deflect under the action of the radially inward force component. Here the circumferential contraction of the ring member will cause the indicator ring ends 20 and 21 to approach each other until they finally just about make mutual contact as illustrated by the tightening of nut 35. At this point the nut and bolt will have been tightened to a predetermined extent and the load then existent in the fastening means will be within a desired range. In this tightened condition of the parts the effectively closed ring 13 will prevent foreign particles from getting into the conical recess of washer 12 and will thus inhibit contamination of the mutual bearing surfaces of the washer 12 and the ring 13.

As will be apparent the size of the parts and the normal spacing of the ring ends 20 and 21 will, in any particular application, be secifically determined by the maximum load that is to be sensed and indicated.

It will be noted that the washer 12 is not deformed by the working loads applied to the unit. Also the split wire ring 13 is not axially deformed but when assembled remains in a substantially fixed transverse plane wherein it may symmetrically receive and support the axial load applied to the bolt. Although the circumferential contraction or expansion of the ring causes the gap between the ring ends to vary the uniform peripheral contact and support afforded to washers 11 and 12 by the ring remains substantially unchanged. Furthermore the line of action of the forces in this system act in such a direction as to make it a very efficient locking device which constantly acts to prevent loosening of an associated nut and bolt.

The composite unit 10 shown in FIGS. 1-3 and 5 may be used where either flat or non-flat elements are to be mutually secured together. Where it is desired to secure just flat type members, such as 30 and 31 of FIG. 5, a slightly modified arrangement of the unit 10 may be used as illustrated in FIG. 4. Here the composite unit 10a is similar in all respects to the above described unit 10 except that the flat washer element 11 is eliminated. Thus when the unit 10a is used for fastening flat type elements together the lower edge of the ring member 13 will directly engage the flat upper surface of the adjacent member, such as plate 30, being fastened. Thereafter the use and operation of the unit 10a will be the same as that described above for the unit 10. Here the adhesive tape 22 will peripherally engage the washer 12 and ring 13 so as to retain the two in juxtaposition as a composite unit.

Use of the instant units 10 and 10a not only provides a convenient and efficient means for indicating the extent to which a nut should be initially tightened, but also will indicate subsequent situations where a bolt and nut assembly may have become loosened, or where the bolted structure may have become unsound. In each of situations the ring ends will move apart thereby indicating a loss of bolt tension. In that any gap present between the ring ends may be readily seen at a glance the instant device permits a rapid visual evaluation of the safety conditions existing in a bolted structure and this inspection capability becomes very significant where it is desirable or even imperative to quickly and accurately check large numbers of bolt type fasteners such as are required in aircraft maintenance.

While the invention has been described with respect to certain preferred examples which have given satisfactory results, it will be understood that various changes and modifications may be made without departing from the spirit and scope of the invention, and it is intended, therefore, in the appended claim, to cover all such changes and modifications.

What is claimed is:

A load sensing and indicating device adapted to be operatively assembled with a nut and bolt fastening means comprising:

a first circular washer member having a substantially circular aperture centrally formed therethrough and through which a bolt may extend;

said washer member having a flat upper bearing surface formed thereon which is disposed in a plane that is substantially normal to the axis of said washer member;

said washer member having a recess formed in the lower side thereof, said recess being defined by a tapered bearing surface which is disposed substantially coaxially with respect to said circular aperture and which convergently tapers towards the said circular aperture;

a second washer member having a central aperture formed therethrough and through which said bolt may extend;

said second washer member having flat upper and lower bearing surfaces that are respectively disposed in planes that are substantially normal to the axis of said second washer members; and a substantially circular split wire ring disposed between the flat upper bearing surface of said second washer member and the tapered bearing surface of said first washer member, said split wire ring being substantially rigid in the direction of the ring axis while being resilient in a plane normal to the ring axis;

said split wire ring having a substantially circular cross sectional shape and having ends that are normally spaced a short distance apart whereby when said first and second washer members together with said ring are operatively assembled with an associated nut and bolt and the nut tightened the axial working load thereby applied to the wire ring by said flat and tapered bearing surfaces will cause said ring ends to move towards each other to an extent corresponding to said axial load so as to thereby afford a visual indication of the tension existing in said bolt;

the split ring being arranged and proportioned so that when the desired loading is applied to said bolt said ring ends will be substantially touching each other whereby the ring is substantially closed thus isolating the inner bearing surfaces of said washer member and ring from foreign particles that could damage said bearing surfaces;

no portion of said split ring extending beyond the radial limits of said first washer member and there being no motion amplifying means connected to said split ring that extend outwardly beyond the limits of the periphery of said washer members.

References Cited by the Examiner

UNITED STATES PATENTS

| | | | |
|---|---|---|---|
| 2,394,812 | 2/46 | Seitz | 85—62 |
| 3,060,731 | 10/62 | Adise | 85—62 |

EDWARD C. ALLEN, *Primary Examiner.*